(12) United States Patent
Whitton et al.

(10) Patent No.: US 11,629,424 B2
(45) Date of Patent: Apr. 18, 2023

(54) SYSTEM FOR FIXTURING A GAS TURBINE ENGINE COMPONENT FOR AN ELECTROPLATING PROCESS

(71) Applicant: Chromalloy Gas Turbine LLC, Palm Beach Gardens, FL (US)

(72) Inventors: James Whitton, Moseley, VA (US); Zachary Hopkins, West Palm Beach, FL (US); Zachary Oras, Riverview, FL (US)

(73) Assignee: Chromalloy Gas Turbine LLC, Palm Beach Gardens, FL (US)

( * ) Notice: Subject to any disclaimer, the term of this patent is extended or adjusted under 35 U.S.C. 154(b) by 226 days.

(21) Appl. No.: 16/897,857

(22) Filed: Jun. 10, 2020

(65) Prior Publication Data

US 2021/0388522 A1 Dec. 16, 2021

(51) Int. Cl.
*C25D 17/06* (2006.01)
*B33Y 80/00* (2015.01)
*C25D 5/02* (2006.01)
*C25D 7/00* (2006.01)
*F01D 5/28* (2006.01)

(52) U.S. Cl.
CPC ............. *C25D 5/022* (2013.01); *C25D 7/008* (2013.01); *C25D 17/06* (2013.01); *F01D 5/288* (2013.01); *B33Y 80/00* (2014.12); *F05D 2230/90* (2013.01); *F05D 2260/30* (2013.01)

(58) Field of Classification Search
CPC ........ C25D 5/022; C25D 7/008; C25D 17/06; C25D 17/08; F01D 5/288; F01D 25/285; B33Y 80/00; F05D 2230/90; F05D 2260/30; F05D 2230/31
See application file for complete search history.

(56) References Cited

U.S. PATENT DOCUMENTS 9,506,357 B1 * 11/2016 Bassett .................. F16H 41/28

* cited by examiner

*Primary Examiner* — Rick K Chang
(74) *Attorney, Agent, or Firm* — Avek IP, LLC (57) ABSTRACT

The present disclosure provides for improvements in fixturing parts in preparation for an electroplating process, thus reducing part handling. The system provides a reusable masking tool comprising a main body having an opening with a removeable coverplate positioned within the opening and one or more locking tabs engaging a corresponding relief slot in at least one of the sidewalls of the main body. The system also comprises a fastener moveably secured within the main body and extending through a top surface of the main body. The main body, fastener, and coverplate may be fabricated from a polymer material by way of an additive manufacturing process. A shank, fabricated from a conductive material, extends through the fastener and is engaged with the fastener such that upon rotation of the fastener, the shank is drawn into contact with the gas turbine engine component, thus providing a conduit for the electroplating process.

19 Claims, 7 Drawing Sheets

SYSTEM FOR FIXTURING A GAS TURBINE ENGINE COMPONENT FOR AN ELECTROPLATING PROCESS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This present disclosure relates generally to a system and method for improving the masking of a gas turbine engine component in preparation for an electroplating process. More specifically, embodiments of the present disclosure relate to an improved masking tool which provides for ease of use, rapid tool production, and reduced handling of gas turbine engine parts during the plating process.

BACKGROUND OF THE DISCLOSURE

A gas turbine engine typically comprises a multi-stage compressor coupled to a multi-stage turbine via an axial shaft. Air enters the gas turbine engine through the compressor where its temperature and pressure increase as it passes through subsequent stages of the compressor. The compressed air is then directed to one or more combustors where it mixes with a fuel source to create a combustible mixture. This mixture is ignited in the one or more combustors to create a flow of hot combustion gases. These gases are directed into the turbine causing the turbine to rotate, thereby driving the compressor. The output of the gas turbine engine can be mechanical thrust via exhaust from the turbine or shaft power from the rotation of an axial shaft, where the axial shaft can drive a generator to produce electricity.

The turbine section of the gas turbine engine typically comprises a plurality of alternating stages of rotating and stationary airfoils. Due to the operating temperatures and mechanical load experienced in the turbine section, these rotating and stationary airfoils, also commonly referred to as blades and vanes, respectively, are cast from high strength, high temperature alloys, such as nickel and cobalt. Depending on the specific temperature at each stage of the turbine, many of these blades and vanes are hollow and air-cooled. In order to maximize and extend service life, many blades and vanes include the application of one or more coatings to various internal and external surfaces of the blade and vane.

One such coating process applied to internal and external surfaces of turbine airfoils is the electroplating of exotic materials, such as platinum. The application of platinum composite coatings to turbine airfoils creates a highly refractory and temperature resistant component with increased hot corrosion resistance and reduced oxidation levels, thus extending the maintenance intervals and overall life of the turbine airfoil.

Traditionally, successful electroplating of components in such industrial type applications, such as turbine blade and vane manufacturing, requires the process to exhibit good electrical properties, ductility, good diffusion properties and even thickness distribution. In an electroplating process, an electric current is used to reduce dissolved metal particles, such that the dissolved particles form a thin metal coating on a surface, thus improving the surface properties of the part. The part to be plated typically serves as the cathode in the circuit while the metal to be plated to the part is the anode. The parts are placed in a solution, the electrolyte, containing dissolved metal salts and ions that permit the flow of electricity. Upon a flow of electricity to the system, the dissolved metal ions in the solution "plate out" onto the cathode, or the gas turbine engine component, thus forming a thin coating over the desired surface.

While there are various materials that can be used and numerous turbine airfoil geometries to which such coating can be applied, one common problem experienced industry-wide is the time and effort expended to prepare the parts for the coating process. Typically, the portion of the airfoil exposed to the hot combustion gases and certain adjacent regions are the sections being coated while the remaining portions are masked or protected from the coating process. This masking process can be a labor-intensive, timely and costly process, as each part is individually taped, or otherwise protected in preparation for the coating process and then after the plating process, the masking is removed and the part is cleaned.

Typical electroplating processes use metal tooling fabricated from multiple parts to contain the gas turbine component and manipulate the component during the electroplating process. The manufacturing of these tools often takes considerable time and is expensive due to the traditional tooling manufacturing techniques utilized. Historically, these tools also implement the use of fasteners to secure parts together requiring handheld tools and additional handling and manipulation of the parts to be plated.

BRIEF SUMMARY OF THE DISCLOSURE

The following presents a simplified summary of the disclosure to provide a basic understanding of some aspects thereof. This summary is not an extensive overview of the application. It is not intended to identify critical elements of the disclosure or to delineate the scope of the disclosure. Its sole purpose is to present some concepts of the disclosure in a simplified form as a prelude to the more detailed description that is presented elsewhere herein.

The present disclosure provides systems and methods for improving part preparation in advance of an electroplating process by providing a reusable masking tool that enables direct transfer from the masking process to the plating process thus minimizing handling of the part to be plated.

In an embodiment of the disclosure, a system for securing a gas turbine engine component undergoing an electroplating process is provided. The system comprises a main body having an opening at a first end with a removeable coverplate positioned within the opening and secured to the main body by one or more mechanisms. The system also comprises a fastener moveably secured within the main body and extending through a top surface of the main body. A shank extends into the fastener and is engaged with the fastener such that upon rotation of the fastener, the shank is drawn into contact with the gas turbine engine component positioned in the main body.

In an alternate embodiment of the disclosure, a housing for use in masking a portion of a gas turbine engine component during an electroplating process is provided. The housing comprises a main body having a first end, a second end, a top surface and opposing bottom surface, and a pair of sidewalls extending between the first end and second end, where the sidewalls each have a relief slot. A removeable coverplate is positioned within the opening and is secured to the sidewalls of the main body by way of a plurality of locking tabs engaging the relief slots. A fastener extends through the top surface in main body and is positioned such that it is free to rotate relative to the main body.

In yet another embodiment of the disclosure, a method of preparing a gas turbine engine component for an electroplating process is disclosed. A masking system is provided comprising a main body, a removeable coverplate, a fastener located partially within the main body and a shank engaged with the fastener. The gas turbine engine component is placed through an opening in the main body and held within the main body by a retention slot. A coverplate is placed over the opening such that one or more locking tabs extend into the main body and are secured to the relief slots in the sidewalls of the main body, thus securing the coverplate to the main body and positioning the gas turbine engine component in the proper orientation for the electroplating process.

In yet another embodiment of the present disclosure, a system of gas turbine components fixtured for an electroplating process is provided. The system comprises a support bar, one or more mounting fixtures coupled to the support bar and one or more systems for securing a gas turbine component undergoing an electroplating process to a corresponding mounting fixture.

These and other features of the present disclosure can be best understood from the following description and claims.

BRIEF DESCRIPTION OF THE SEVERAL VIEWS OF THE DRAWINGS

The present disclosure is described in detail below with reference to the attached drawing figures, wherein.

DETAILED DESCRIPTION

The present disclosure is intended for use in the manufacturing or repair of a gas turbine engine component, such as a turbine blade, vane, or other gas turbine component undergoing an electroplating process. As such, the present disclosure is capable of being used with a variety of gas turbine engine components, regardless of the manufacturer.

As those skilled in the art will readily appreciate, a gas turbine engine component, such as a turbine blade and vane, is a complex component having intricate geometric profiles including cooling features, cooling holes, thin walls, and operates under extreme operating temperatures and mechanical loading. Depending on the operating conditions, it is often desirable to apply one or more coatings to the blade and vane surfaces to reduce oxidation and erosion and to shield the part from the high operating temperatures.

The present disclosure provides an improved system for fixturing a gas turbine engine component undergoing an electroplating process. Through the present disclosure, the need for manual masking of surfaces not being coated is greatly reduced, thereby saving time, reducing costs and reducing the amount of contact with the part during the coating process, and therefore likelihood of part damage during the coating process.

Various embodiments of the present disclosure are depicted in FIGS. 1-7B. Referring initially to FIGS. 1-5, a system 100 for securing a gas turbine engine component undergoing an electroplating process is provided. The system 100 comprises a main body 102 having a top surface 104 with a top opening 105 and an opposing bottom surface 106. The main body 102 also comprises a first end 108 having an opening 110 therein and an opposing second end 112. Located within the main body 102 is a retention slot 113, which is sized accordingly for securing the gas turbine engine component 200 in the main body 102 at a predetermined orientation. A first sidewall 114 and a second sidewall 116 are spaced between the first end 108 and the second end 112, where at least one of the first sidewall 114 and the second sidewall 116 have a relief slot 118.

The system 100 further comprises a removeable coverplate 120 positioned within the opening 110 of the first end 108. In an embodiment of the disclosure, the coverplate 120 includes an end plate 122 and one or more locking tabs 124 for engaging a corresponding relief slot 118 in at least one of the first sidewall 114 and the second sidewall 116. In the embodiment of the disclosure depicted in FIGS. 1-5, the coverplate 120 comprises two locking tabs 124, for engaging a relief slot 118 on each of the first sidewall 114 and the second sidewall 116. Extending from the end plate 122 and opposite of the locking tabs 124, is a pull tab 126. In order to remove the coverplate 120, the locking tabs 124 are depressed at the relief slots 118 and the pull tab 126 is used to pull the coverplate 120 out of the main body 102. However, as one of ordinary skill in the art will understand, the one or more locking tabs 124 is but one type of mechanism for securing the coverplate to the main body. The one or more locking tabs 124 is a configuration that lends itself to production by way of the additive manufacturing process with a polymer material, as described herein. Alternate mechanisms for securing the coverplate, such as traditional fasteners or other locking devices, may also be utilized depending on the type of material used and how the main body and coverplate are manufactured.

A fastener 140 is moveably secured within the main body 102 and extends through the top surface 104. This is more clearly depicted in FIG. 4, which is a cross section of the system 100. The fastener 140 is generally cylindrical in shape and configured such that it comprises a flared end 142 having a diameter greater than the top opening 105 such that the fastener 140 is retained within the main body 102. However, the flared end 142 is undersized with respect to the cavity provided in the main body 102, thereby permitting the fastener 140 to rotate and move within the main body 102. The fastener 140 further comprises an internal opening 144, a portion of which includes internal threads 146.

Figure 1:
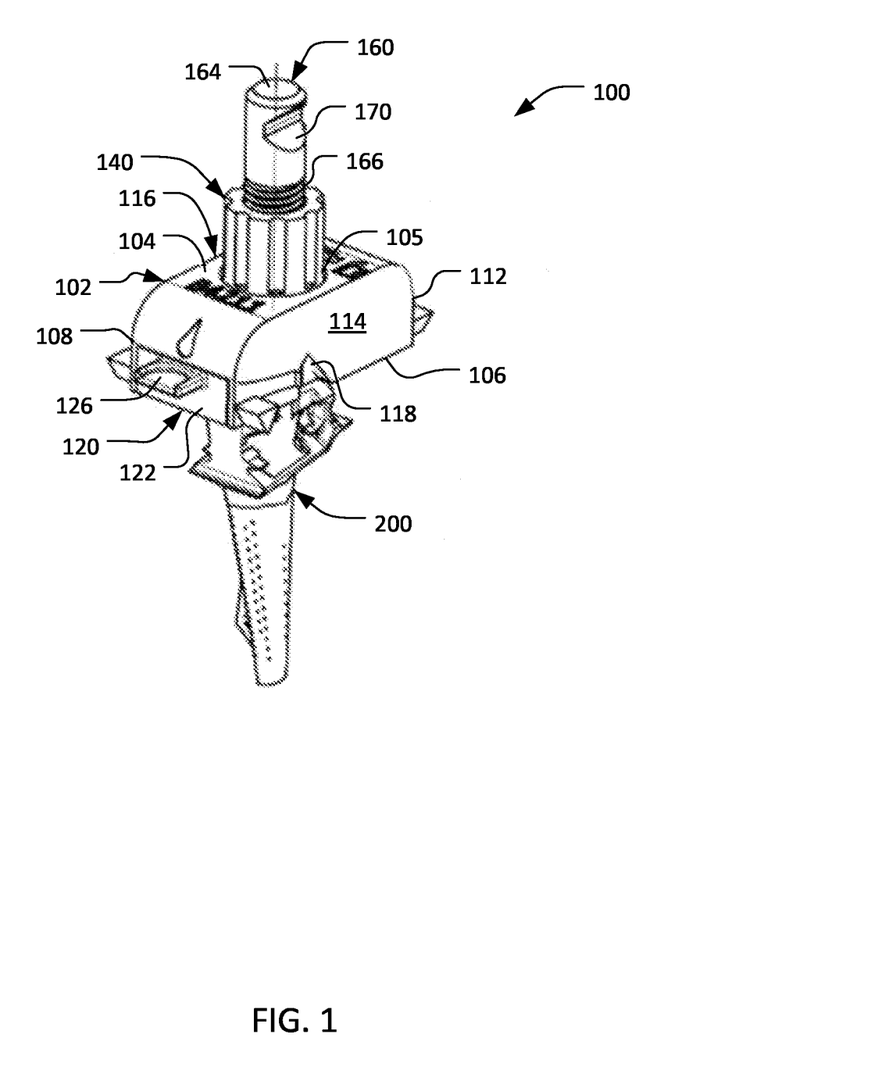
FIG. 1 is a perspective view of a system for securing a gas turbine component for an electroplating process, in accordance with an embodiment of the present disclosure.
Figure 2:
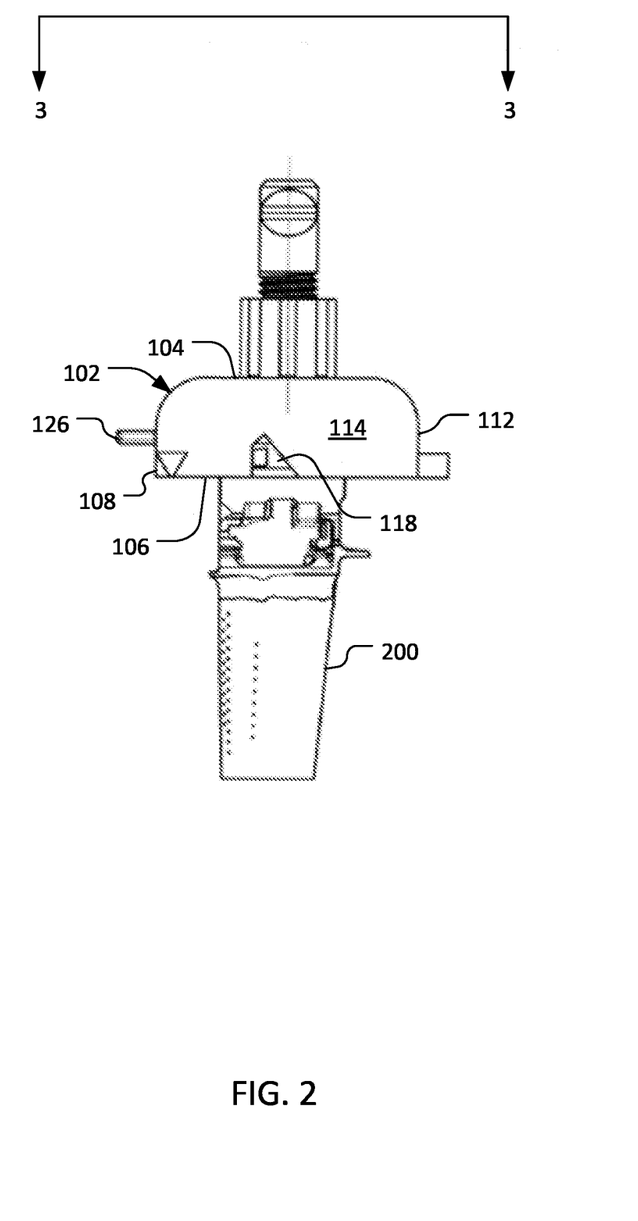
FIG. 2 is an elevation view of the system of FIG. 1 in accordance with an embodiment of the present disclosure.
Figure 3:
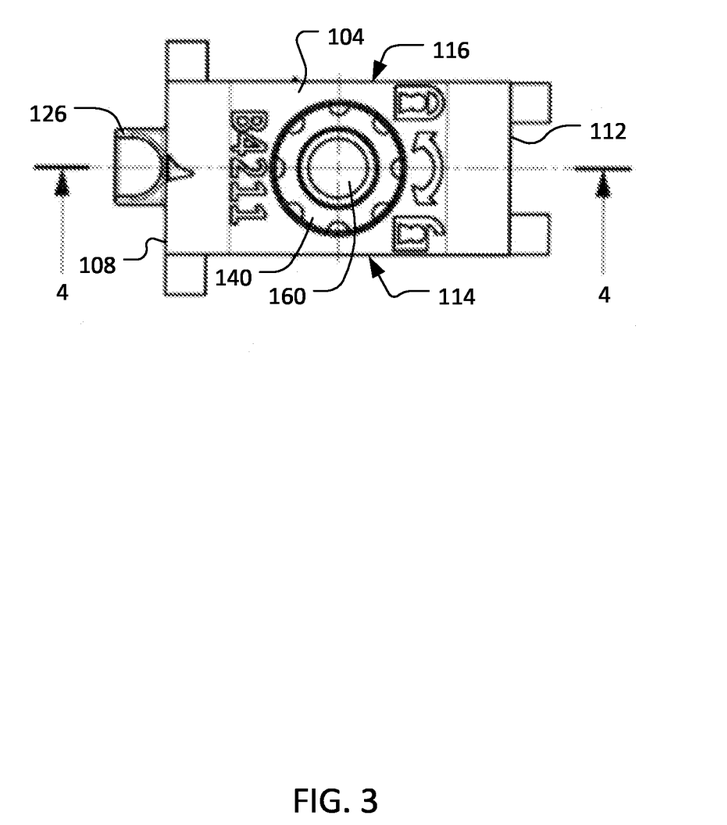
FIG. 3 is a top elevation view of the system of FIG. 2 in accordance with an embodiment of the present disclosure.
Figure 4:
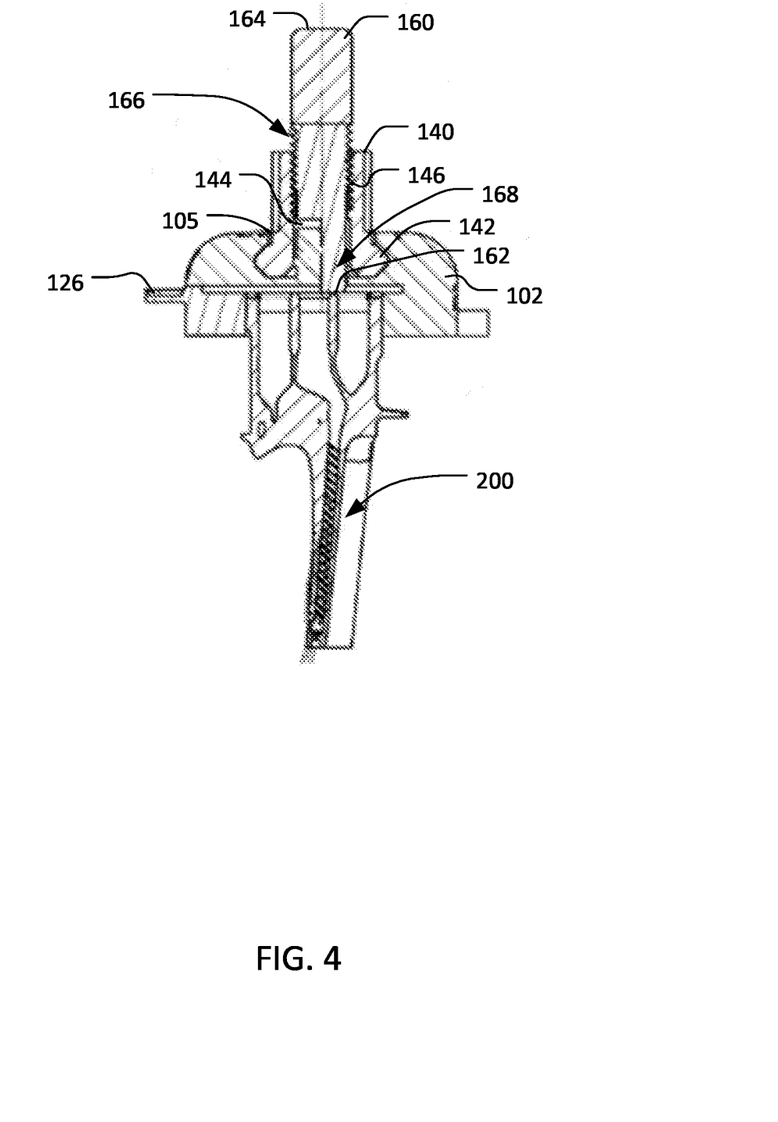
FIG. 4 is a cross section view of the system of FIG. 3 in accordance with an embodiment of the present disclosure.
Figure 5:
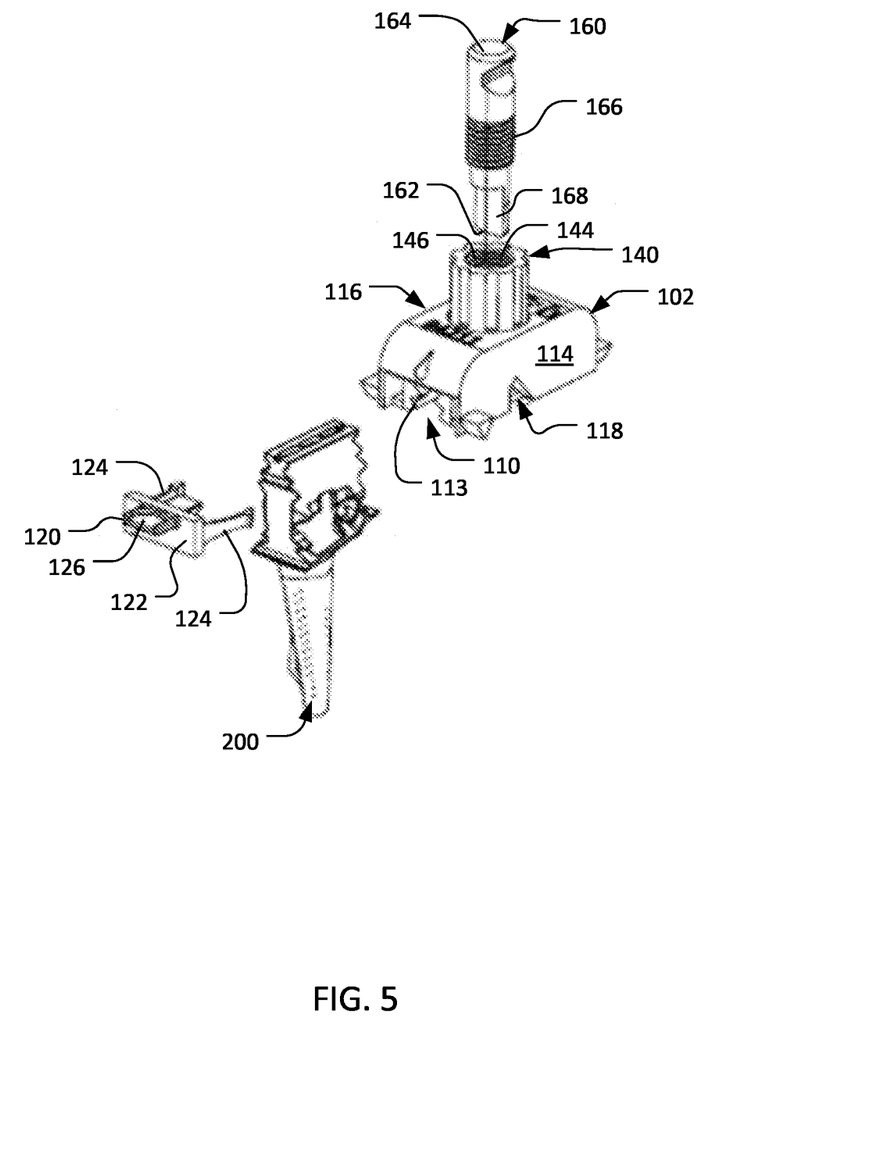
FIG. 5 is an exploded perspective view of the system of FIG. 1 in accordance with an embodiment of the present disclosure.

The system 100 also comprises a shank 160 having a first end 162 and an opposing second end 164. The shank 160 includes a threaded portion 166 located along a portion of the shank outer surface between the first end 162 and the second end 164. The shank 160, as depicted in FIGS. 4 and 5, also includes an asymmetric profile 168 proximate the first end 162. The asymmetric profile 168 is sized to align with the contact surface of the gas turbine engine component 200. The shank 160 also comprises a notch 170 proximate the second end 164 for fixturing the part to be plated in the assembly tooling as described further below. As one skilled in the art will understand, the shank 160 is fabricated from a conductive material, which is necessary for closing the electrical circuit between the electrical source and the gas turbine engine component 200 during the electroplating process. One such material utilized for the shank 160 is titanium.

As shown in FIGS. 1-4, the shank 160 is engaged with the fastener 140 by the corresponding threaded portion 166 of shank 160 and internal threads 146 of fastener 140. More specifically, the shank 160 is placed within the internal opening 144 of the fastener 140 and upon rotation of the fastener 140, the first end 162 of the shank 160 is drawn into contact with a gas turbine engine component 200 positioned within the main body 102.

For the system 100 depicted in FIGS. 1-5, the gas turbine engine component 200 fixtured in the system 100 is a turbine blade. As depicted, the portion of the blade not masked by the system 100, the blade neck and airfoil, is exposed beneath the bottom surface 106 of the main body 102, thus permitting these regions to undergo the electroplating process, unless otherwise masked by an additional tool or traditional masking process. The blade is held within the main body 102 by a retention slot 113 having a profile corresponding to the attachment or root portion of the blade. As one skilled in the art will understand, the present disclosure is not limited to the configuration depicted but includes alternate blade configurations having different style retention slots 113. Depending on the surfaces to undergo the electroplating process, the size and shape of the main body 102, or housing as it is also referred to, will vary or the blade may be repositioned as needed within the main body 102. Furthermore, it is also envisioned that the present disclosure is not limited to use with a turbine blade. Various other gas turbine engine components, such as turbine vanes, shroud duct segments, or other components can also be fixtured utilizing the present disclosure. Furthermore, while the present disclosure applies to a gas turbine engine component, it is conceivable to apply aspects of the present disclosure to technologies requiring electroplating processes other than gas turbine technology.

The system 100 provides an improvement over the manual masking techniques utilized in the prior art by providing reusable tooling into which a gas turbine engine component can be secured, the system 100 undergoes an electroplating process, and the engine component is then removed and the components of the system 100 can be reused.

The system 100 can be fabricated through a variety of processes and from a variety of materials. While the main body 102, the removeable coverplate 120, and the fastener 140 can be manufactured and assembled using typical machining and assembly techniques, such processes are costly and time consuming. Each of these components of system 100 can be fabricated from an additive manufacturing or 3-D printing process. Furthermore, for such rapid manufacturing techniques, each of the main body 102, the removeable coverplate 120 and the fastener 140 can be fabricated from a rigid polymer material having suitable strength to manipulate a gas turbine engine component and a softening temperature above 200 degrees Fahrenheit. One such acceptable material is Acrylonitrile Butadiene Styrene (ABS) and may have ultraviolet (UV) tolerant properties if needed, such as Acrylonitrile Styrene Acrylate (ASA). Using these materials, the main body 102, the removeable coverplate 120 and the fastener 140 can be produced using additive manufacturing methods such as fused deposition modeling 3-D printing or other acceptable means.

When utilizing an additive manufacturing process with the materials outlined above, the main body 102 and fastener 140 can be fabricated integrally so there is no need for multiple parts or complicated assembly techniques of the main body 102. That is, the main body 102 and fastener 140 can be printed such that a soluble material is printed between the surfaces of main body 102 surrounding the fastener 140. Then, the soluble material between the main body 102 and fastener 140 is dissolved, thereby creating a gap between the main body 102 and the fastener 140 resulting in the fastener 140 being able to rotate and move within the main body 102, but yet be contained by the top surface 104 of the main body 102.

In an embodiment of the disclosure, a method of preparing a gas turbine engine component for an electroplating process is provided. A masking system as outlined herein, including a main body 102, a removeable coverplate 120 having an end plate 122 and one or more locking tabs 124, a fastener 140 located at least partially within the main body 102, and a shank 160 engaged with the fastener 140, is provided. The gas turbine engine component 200 is then placed through an opening in the main body 102 such that the component 200 is held within the main body 102 by a retention slot 113. Once the engine component 200 is positioned within the main body 102, the removeable coverplate 120 is positioned over the opening in the main body, such that the one or more locking tabs 124 extend into the main body 102 and are secured to one or more corresponding relief slots 118 in the sidewalls of the main body 102. A shank 160, which is fabricated from a conductive material and has external threads located thereon, is then inserted into the fastener 140 and the fastener 140 is rotated relative to the shank 160, thereby drawing the shank 160 into contact with the gas turbine engine component 200.

Once the gas turbine engine component 200 is secured within the main body 102, the system 100 is secured to the adjacent tooling for placing the engine component 200 in the solution and for connecting the engine component 200 to a source of electrical charge to complete the plating process. One such assembly utilizing the system 100 is depicted in FIGS. 6A-7B.

Figure 6A:
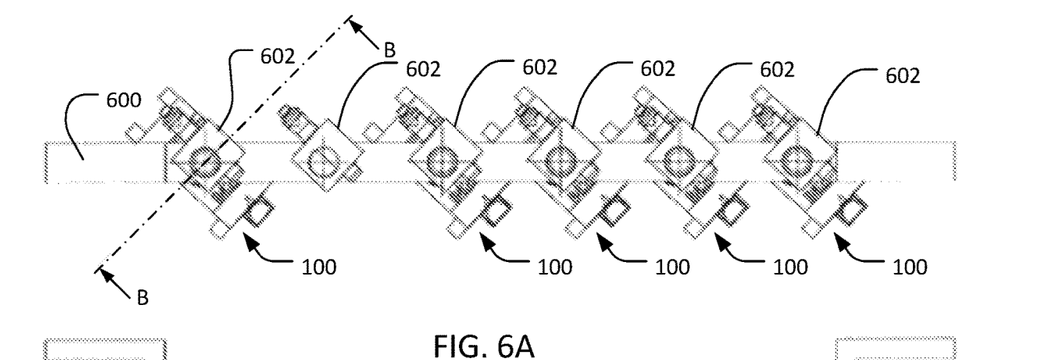
FIG. 6A is a top elevation view of a plurality of gas turbine engine components each utilizing the system of FIG. 1 in accordance with an embodiment of the present disclosure.
Figure 6B:
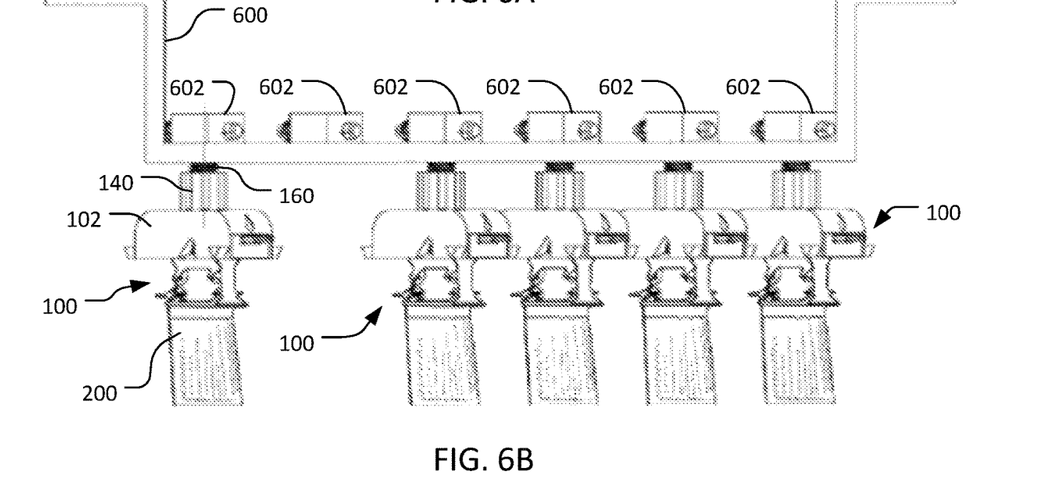
FIG. 6B is a side elevation view of the system depicted in FIG. 6A in accordance with an embodiment of the present disclosure.
Figure 7A:
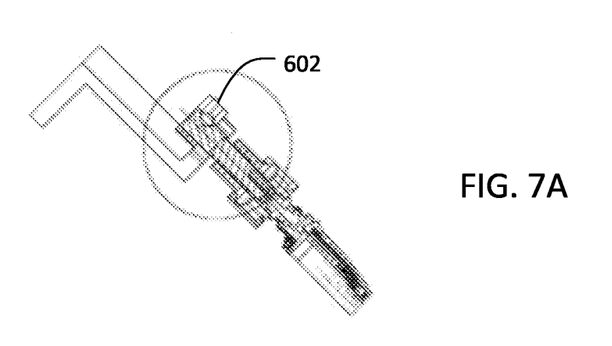
FIG. 7A is a cross section view of a system of FIG. 1 secured to the electroplating equipment in accordance with an embodiment of the disclosure.
Figure 7B:
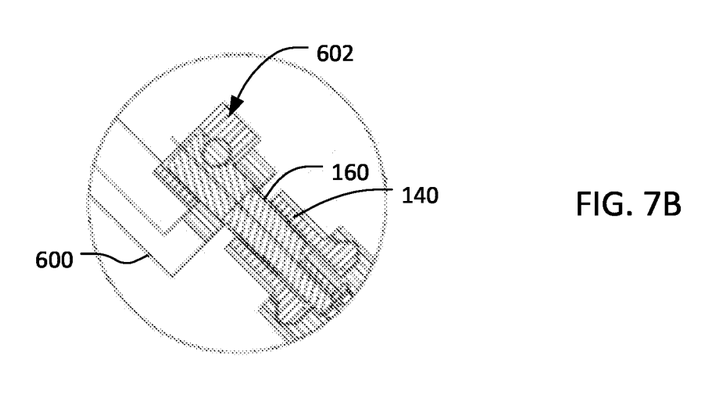
FIG. 7B is a detailed cross section view of a portion of the system of FIG. 7A in accordance with an embodiment of the present disclosure.

Referring now to FIGS. 6A and 6B, a top elevation view and side elevation view, respectively, of an electroplating assembly are depicted and include a plurality of systems 100 for securing gas turbine engine components for an electroplating process. A plurality of systems 100 are shown coupled to a support bar 600 through respective mounting fixtures 602 which are shown in additional detail and cross section in FIGS. 7A and 7B. The mounting fixture 602, which is fabricated from a conductive material is maintained in contact with the shank 160, which is in turn in contact with gas turbine engine component 200, as discussed above. In the electroplating process, a source of electric current is provided to each of the mounting fixtures 602 and to the corresponding gas turbine engine component by way of direct contact with the shank 160.

Often times, prior to a part undergoing an electroplating process, it is necessary for certain surfaces of the gas turbine component to be masked protecting these surfaces from the electroplating materials and process. For example, the present disclosure can be used as part of a system of gas turbine components fixtured for an electroplating process. One such masking process in which the present disclosure may be utilized is in conjunction with a ultraviolet cured maskant that is applied robotically to the gas turbine components once secured in the tooling fixtures, as discussed above and shown in FIGS. 6A and 6B. Use of the present disclosure provides for a controlled attachment of the gas turbine component 200 to the support bar 600 and mounting fixtures 602 and manipulation of the assembly for the application of additional maskant.

Although a preferred embodiment of this disclosure has been provided, one of ordinary skill in this art would recognize that certain modifications would come within the scope of this disclosure. For that reason, the following claims should be studied to determine the true scope and content of this disclosure. Since many possible embodiments may be made of the disclosure without departing from the scope thereof, it is to be understood that all matter herein set forth or shown in the accompanying drawings is to be interpreted as illustrative and not in a limiting sense.

From the foregoing, it will be seen that this disclosure is one well adapted to attain all the ends and objects hereinabove set forth together with other advantages which are obvious, and which are inherent to the structure.

It will be understood that certain features and subcombinations are of utility and may be employed without reference to other features and subcombinations. This is contemplated by and is within the scope of the claims.

What is claimed is:

1. A system for securing a gas turbine engine component undergoing an electroplating process comprising:
   a main body having a top surface, an opposing bottom surface, a first end with an opening therein, an opposing second end, and a first sidewall and second sidewall spaced between the first end and the second end;
   a removeable coverplate positioned within the opening of the first end and having an end plate and one or more mechanisms for securing the coverplate to the main body;
   a fastener movably secured within the main body and extending through the top surface of the main body; and
   a shank having a first end, an opposing second end and a threaded portion between the first end and the second end;
   wherein the shank is engaged with the fastener such that upon rotation of the fastener, the first end of the shank is drawn into contact with the gas turbine engine component positioned in the main body.

2. The system of claim 1, wherein the main body is fabricated using an additive manufacturing process.

3. The system of claim 2, wherein the main body is fabricated from a polymer material.

4. The system of claim 3, wherein the coverplate is fabricated from a polymer material.

5. The system of claim 4, wherein the one or more mechanisms of the coverplate comprises a plurality of locking tabs for engaging one or more corresponding relief slots in at least one of the first sidewall and the second sidewall.

6. The system of claim 3, wherein the fastener is fabricated from a polymer material.

7. The system of claim 1, wherein the main body further comprises a retention slot for securing the gas turbine engine component in the main body at a predetermined orientation.

8. The system of claim 1, wherein the shank is fabricated from conductive material.

9. The system of claim 1, wherein the shank further comprises an asymmetric profile proximate the first end of the shank.

10. The system of claim 1, wherein the fastener further comprises internal thread corresponding to the threaded portion of the shank.

11. A housing for use in masking a portion of a gas turbine engine component during an electroplating process, the housing comprising:
    a main body having a top surface, an opposing bottom surface, a first end with an opening therein, an opposing second end, and a first sidewall and second sidewall spaced between the first end and the second end, the first sidewall and second sidewall each having a relief slot;
    a removeable coverplate positioned within the opening of the first end and having an end plate and a plurality of locking tabs for engaging the relief slots of the first sidewall and second sidewall; and
    a fastener having a portion located within the main body and extending through the top surface of the main body, the fastener positioned such that it is free to rotate relative to the main body.

12. The housing of claim 11, wherein the housing is fabricated using an additive manufacturing process.

13. The housing of claim 12, wherein the housing is fabricated from a polymer material.

14. The housing of claim 12, wherein the fastener further comprises a cylindrical opening at one end thereof with the cylindrical opening having a plurality of internal threads.

15. The housing of claim 11 further comprising a retention slot in the bottom surface configured to hold the gas turbine engine component within the housing.

16. The housing of claim 11, wherein the removeable coverplate further comprises a pull tab extending away from the endplate, opposite from the plurality of locking tabs.

17. A system of a plurality of gas turbine components fixtured for an electroplating process comprising:
    a support bar;
    a plurality of mounting fixtures coupled to the support bar;
    a plurality of securing systems for securing the plurality of gas turbine components undergoing the electroplating process, each of the plurality of securing systems coupled to one of the plurality of mounting fixtures and comprising:
    (1) a main body having a top surface, an opposing bottom surface, a first end with an opening therein, an opposing second end, and a first sidewall and second sidewall spaced between the first end and the second end, at least one of the first sidewall and second sidewall having a relief slot;
    (2) a removeable coverplate positioned within the opening of the first end and having an end plate and one or more locking tabs for engaging a corresponding relief slot in at least one of the first sidewall and the second sidewall;

(3) a fastener movably secured within the main body and extending through the top surface of the main body; and (4) a shank having a first end, an opposing second end having an asymmetric profile, a threaded portion between the first end and the second end, and a notch located proximate the second end;

wherein the shank is engaged with the fastener and main body such that the asymmetric profile and notch of the shank permit controlled attachment and manipulation of the system for application of maskant to the gas turbine engine component once installed within a mounting fixture.

18. The system of claim 17, wherein the application of maskant comprises an ultraviolet cured maskant.

19. The system of claim 18, wherein the maskant is applied by an automated process.

\* \* \* \* \*